(12) United States Patent
Angaiah et al.

(10) Patent No.: US 6,849,246 B2
(45) Date of Patent: Feb. 1, 2005

(54) SOLID STATE SYNTHESIS OF LITHIUM META ARSENITE

(75) Inventors: Subramanian Angaiah, Karaikudi (IN); Vasudevan Thiagarajan, Karaikudi (IN); Gnagadharan Ramaiyer, Karaikudi (IN); Raghavan Meenakshisundaram, Karaikudi (IN)

(73) Assignee: Council of Scientific & Industrial Research, New Delhi (IN)

( * ) Notice: Subject to any disclaimer, the term of this patent is extended or adjusted under 35 U.S.C. 154(b) by 224 days.

(21) Appl. No.: 10/108,696

(22) Filed: Mar. 29, 2002

(65) Prior Publication Data

US 2003/0185745 A1 Oct. 2, 2003

(51) Int. Cl.$^7$ ............................................... C01G 28/00
(52) U.S. Cl. ....................................................... 423/601
(58) Field of Search ................................. 423/601, 602, 423/87, 179.5

(56) References Cited

U.S. PATENT DOCUMENTS

| | | | |
|---|---|---|---|
| 1,700,756 A | 2/1929 | Altwegg et al. | |
| 2,319,777 A | 5/1943 | Le Due | |
| 2,396,465 A | 3/1946 | Karr | |
| 3,511,598 A | 5/1970 | Young | |
| 6,682,712 B2 * | 1/2004 | Angaiah et al. | ............ 423/464 |

OTHER PUBLICATIONS

Grant & Hackh's Chemical Dictionary, 5$^{th}$ Ed., 1987, no month, pp. 51, 52.*

* cited by examiner

Primary Examiner—Steven Bos
(74) Attorney, Agent, or Firm—Sughrue Mion, PLLC

(57) ABSTRACT

The present invention provides a novel solid state method for the synthesis of lithium meta arsenite (LiAsO$_2$) by mixing a lithium source with arsenious trioxide under controlled conditions to obtain the lithium meta arsenite.

9 Claims, 1 Drawing Sheet

SOLID STATE SYNTHESIS OF LITHIUM META ARSENITE

FIELD OF THE INVENTION

Figure 1:
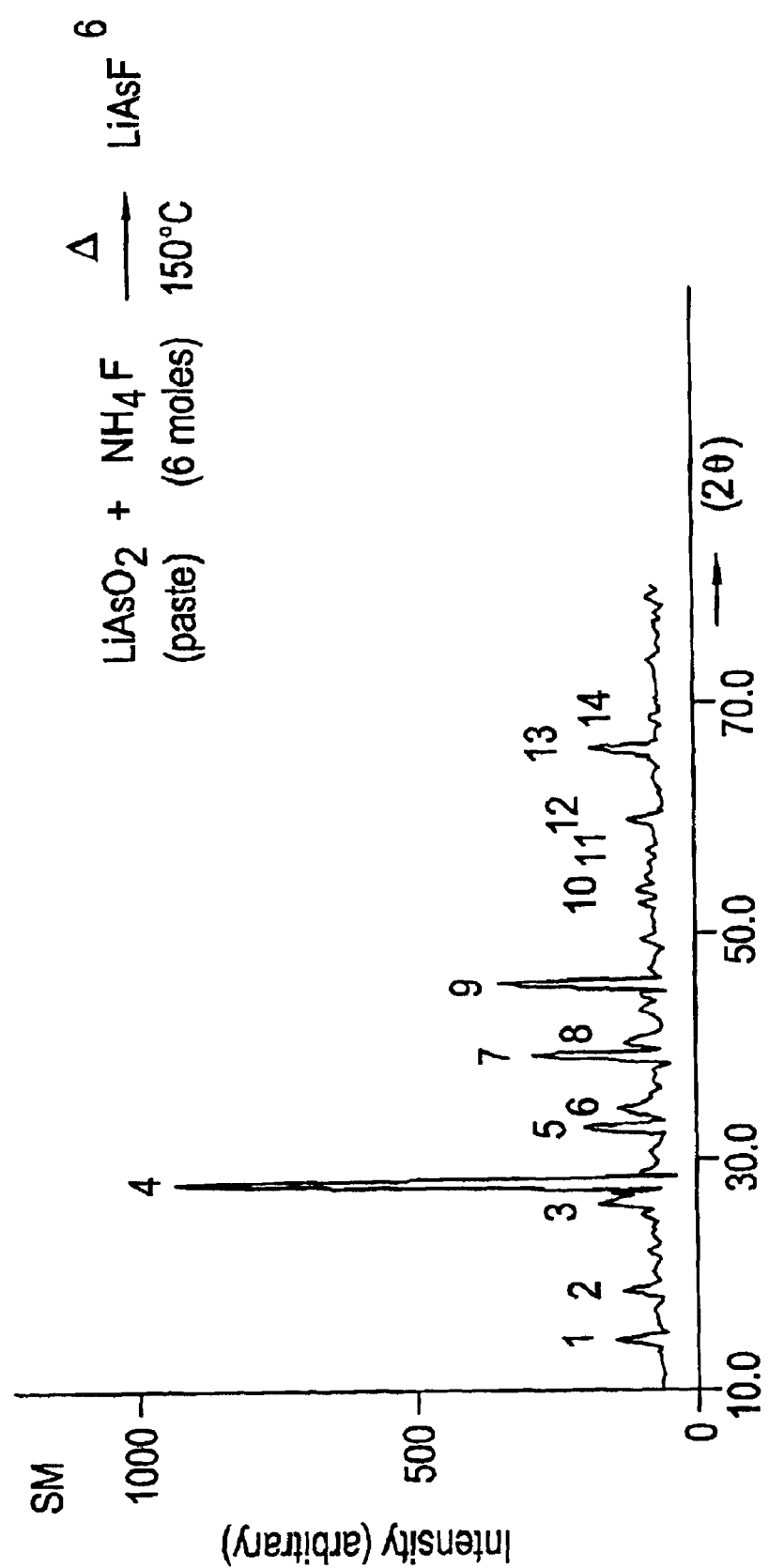

The present invention provides a novel process for the preparation of lithium meta arsenite ($LiAsO_2$) useful as an intermediate for the preparation of lithium hexafluro arsenate ($LiAsF_6$) which is a secondary lithium ion battery electrolyte for nonaqueous solid state and polymer electrolyte.

BACKGROUND OF THE INVENTION

Lithium meta arsenite ($LiAsO_2$) is not well documented in literature although the corresponding equivalent sodium compound known as sodium meta arsenite ($NaAsO_2$) is well documented in literature. This compound easily decomposes in acid media to arseneous trioxide ($As_2O_3$). Since other methods are not available to prepare this compound, as of today there is nothing to write about the disadvantages.

OBJECTS OF THE INVENTION

The main object of this invention is to provide a novel hitherto unattempted method for the synthesis of lithium meta arsenite ($LiAsO_2$) salt.

Another object of this invention is to provide a simple thermal method for the synthesis of lithium meta arsenite ($LiAsO_2$).

Yet another object of this invention is to get a pure product from solid state reactions without any side or partial reaction.

Still yet another object of this invention is to synthesis lithium meta arsenite ($LiAsO_2$) by thermal method.

Yet another object of this invention is to provide a clean reaction by mixing equimolar proportions of lithium salts and arsenous trioxide under closed controlled conditions.

SUMMARY OF THE INVENTION

Accordingly, the present invention provides a novel method for the preparation of lithium meta arsenite ($LiAsO_2$) comprising mixing a lithium source selected from the group consisting of lithium carbonate (dry and AR), lithium oxide (dry and AR quality), lithium nitrate (dry and AR), lithium hydroxide (dry and AR) and any mixture thereof with arsenious trioxide (dry and AR), grinding the mixture and heating the ground mixture to obtain lithium meta arsenite ($LiAsO_2$) and cooling the product so obtained.

In one embodiment of the invention, the reactions are conducted in solid state with the lithium source and arsenious trioxide both being taken in the form of solids.

In another embodiment of the invention, the lithium source is selected from the group consisting of lithium oxide (dry and AR quality), lithium nitrate (dry and AR) and lithium hydroxide (dry and AR) and the heating of the ground mixture of said lithium source with arsenious trioxide is done at a temperature of 400° C. for 4 hours.

In another embodiment of the invention, the lithium source comprises lithium carbonate (dry and AR) and the heating of the ground mixture of said lithium source with arsenious trioxide is done at a temperature of 600° C. for 10 hours.

In another embodiment of the invention, the ground mixture of solid lithium source and solid arsenious trioxide are taken in a silica or porcelain crucible and introduced into a preheated furnace kept at a preheat of 100° C.

In an embodiment of the invention LiOH or $Li_2O$ or $Li_2CO_3$ or $LiNO_3$ is allowed to react with arseneous trioxide ($As_2O_3$) by a solid state thermal procedure.

In still another embodiment of the invention the lithium source and the arsenious trioxide are taken in the molar ratio of 1:1 such that lithium:arsenic are in 1:1 proportion. In yet another embodiment of the invention the process is carried out in a single step.

In yet another embodiment of the invention no side or partial reactions occur.

BRIEF DESCRIPTION OF THE ACCOMPANYING DRAWING

FIG. 1 is the X-ray analysis of the product sample obtained by the process of the invention confirming the purity of the product.

DETAILED DESCRIPTION OF THE INVENTION

Lithium meta arsenite ($LiAsO_2$) is prepared in the present invention by the following procedure which can be considered as pure solid state reaction between two solid state material namely lithium salts of lithium hydroxide or lithium oxide or lithium carbonate or lithium nitrate and arsenous trioxide on specific conditions of heating. Hence, lithium meta arsenite ($LiAsO_2$) is prepared by reacting LiOH or $LiNO_3$ or $Li_2CO_3$ or $Li_2O$ with $As_2O_3$ under controlled heating conditions. A solid state reaction occurs between the salts of lithium mentioned above with arseneous trioixide at specific temperatures and the product lithium meta arsenite ($LiAsO_2$) is formed. Arsenous trioxide is mixed with equimolar proportions of LiOH or $LiNO_3$ or $Li_2Co_3$ or $Li_2O$ salt and the mixture was ground well and the ground mixture was transferred into a silica/porcelain crucible. The crucible containing the lithium salt and arsenous trioxide mixture was slowly heated to 100° C. and then heated to 400° C. for 10 hours in an electric furnace continuously maintaining the temperature. However, in the case of lithium carbonate, arsenous trioxide mixture the heating was raised to 600° C. keeping the same time as 10 hours for maintaining the temperature.

The reaction occurring during the solid state process is given below

$2LiX + As_2O_3 \text{ - - - } \rightarrow 2LiAsO_2 + 2X$ where X is $OH^-$, $O^{2-}$, $NO_3^-$, $CO_3^{2-}$ A novel method for the preparation of lithium meta arsenite ($LiAsO_2$) was developed wherein lithium carbonate (dry and AR) or lithium oxide (dry & AR quality) or lithium nitrate (dry and AR) and lithium hydroxide (dry and AR) are mixed with equimolar quantity or arsenous trioxide (dry and AR). The mixture is ground well and then transferred to a silica or porcelain crucible. The crucible is inserted into a preheated electric furnace kept at a temperature of 100° C. and the heating was slowly raised to 400° C. and the temperature maintained for 4 hours for the mixture containing any of the following lithium salts—LiOH or $LiNO_3$ or $Li_2O$ salt. For the mixture containing $Li_2CO_3$ however the temperature was raised to 600° C. and the heating continued for 10 hours. The product was then removed from the furnace after cooling and analysed the sample by X-ray to confirm the purity and identity of the product.

The reactions that occur are:
a. $2LiOH + As_2O_3 \rightarrow 2LiAsO_2 + H_2O$
b. $2LiNO_3 + As_2O_3 \rightarrow 2LiAsO_2 + 2NO_2$
c. $Li_2CO_3 + As_2O_3 \rightarrow 2LiAsO_2 + CO_2$
d. $Li_2O + As_2O_3 \rightarrow 2LiAsO_2$ LiOH or $Li_2O$ or $Li_2CO_3$ or $LiNO_3$ is allowed to react with arseneous trioxide ($As_2O_3$) by a solid state thermal procedure. The lithium salt and the arsenic salt are taken in the molar ratio of 1:1 such that lithium:arsenic is in 1:1 proportion. A feature of this invention is that the process is carried out in a single step. No side or partial reactions occur.

The following examples are given by way of illustration and therefore should not be construed to limit the scope of the present invention.

EXAMPLE 1

Pure and dry $Li_2CO_3$ is mixed with pure and dry arsenous oxide in equimolar proportion. The mixture was ground well and then the ground mixture was transferred into a silica/porcelain crucible. The mixture was introduced into an electric furnace kept at 100° C. After keeping the mixture for an hour at 100° C. the temperature of the furnace was elevated to 600° C. The heating was done for 10 hours. The heating was discontinued and the furnace was cooled to room temperature. The product obtained was analyzed.

| Components | Composition |
| --- | --- |
| $Li_2CO_3$ | 0.74 g |
| $As_2O_3$ | 1.98 g |
| Initial Temperature | 100° C. |
| Time | 1 hours |
| Final Temperature | 600° C. |
| Time | 10 hours |
| Colour of the product | White |
| Efficiency of the process | >92% |

EXAMPLE 2

Pure and dry LiOH is mixed with pure and dry arsenous oxide in equimolar proportions. The mixture was ground well and then the ground mixture was transferred into a silica/porcelain crucible. The mixture was introduced into an electric furnace kept at 100° C. After keeping the mixture for an hour at 100° C. the temperature of the furnace was elevated to 400° C. The heating was done for 10 hours. The heating was discontinued and the furnace was cooled to room temperature. The product obtained was analyzed.

| Components | Composition |
| --- | --- |
| LiOH | 0.84 g |
| $As_2O_3$ | 1.98 g |
| Initial Temperature | 100° C. |
| Time | 1 hour |
| Final Temperature | 400° C. |
| Time | 10 hours |
| Colour of the product | White |
| Efficiency of the process | >95% |

EXAMPLE 3

Pure and dry $LiNO_3$ is mixed with pure and dry arsenous oxide in equimolar proportions. The mixture was ground well and then the ground mixture was transferred into a silica/porcelain crucible. The mixture was introduced into an electric furnace kept at 100° C. After keeping the mixture for an hour at 100° C. the temperature of the furnace was elevated to 400° C. The heating was done for 10 hours. The heating discontinued and the furnace was cooled to room temperature. The product obtained was analyzed.

| Components | Composition |
| --- | --- |
| $LiNO_3$ | 2.46 g |
| $As_2O_3$ | 7.5 g |
| Initial Temperature | 100° C. |
| Time | 1 hour |
| Final Temperature | 400° C. |
| Time | 10 hours |
| Colour of the product | White |
| Efficiency of the process | >92% |

EXAMPLE 4

Pure and dry $Li_2O$ is mixed with pure and dry arsenous oxide in equimolar proportions. The mixture was ground well and then the ground mixture was transferred into a silica/porcelain crucible. The mixture was introduced into an electric furnace kept at 100° C. After keeping the mixture for an hour at 100° C. the temperature of the furnace was elevated to 400° C. The heating was done for 10 hours. The heating was discontinued and the furnace was cooled to room temperature. The product obtained was analyzed.

| Components | Composition |
| --- | --- |
| $Li_2O$ | 0.6 g |
| $As_2O_3$ | 1.98 g |
| Initial Temperature | 100° C. |
| Time | 1 hour |
| Final Temperature | 400° C. |
| Time | 10 hours |
| Colour of the product | White |
| Efficiency of the process | >95% |

CONCLUSION

1. Lithium salts like $Li_2O$, $Li_2CO_3$, LiOH, $LiNO_3$ or the mixtures are used to react with arseneous trioxide in the molar ratio 1:1.
2. Lithium salts $Li_2O$, $Li_2CO_3$, LiOH, $LiNO_3$ react with $As_2O_3$ to form $LiAsO_2$.
3. A solid state reaction occurs when arseneous trioxide reacts with $Li_2O$, $Li_2CO_3$, LiOH, $LiNO_3$.
4. It is a single step procedure.

We claim:

1. A method for the preparation of lithium meta arsenite ($LiAsO_2$) comprising mixing a lithium source with arsenious trioxide, grinding the mixture and heating the ground mixture to obtain lithium meta arsenite ($LiAsO_2$) and cooling the product so obtained, wherein the lithium source and the arsenious trioxide have the molar ratio of 1:1 such that lithium:arsenic are in 1:1 proportion;

wherein the lithium source is selected from the group consisting of lithium oxide, lithium nitrate, lithium hydroxide and any mixture thereof and the heating of the ground mixture of said lithium source with arsenious trioxide is done at a temperature of 400° C. for 4 to 10 hours.

2. A method as claimed in claim 1 wherein the mixing of the lithium source and the arsenious trioxide is conducted in solid state with the lithium source and arsenious trioxide both in the form of solids.

3. A method as claimed in claim 2 wherein the ground mixture of solid lithium source and solid arsenious trioxide are in a silica or porcelain crucible and introduced into a preheated furnace.

4. A method as claimed in claim 3 wherein the furnace is preheated to 100° C.

5. A method as claimed in claim 1 wherein the LiOH or $Li_2O$ or $Li_2CO_3$ or $LiNO_3$ is reacted with arsenious trioxide ($As_2O_3$) by a solid state thermal procedure.

6. A method as claimed in claim 1 wherein the preparation of lithium meta arsenite is carried out in a single step.

7. A method as claimed in claim 1 wherein no side or partial reactions occur.

8. A method as claimed in claim 1 where the efficiency is greater than 92%.

9. A method for the preparation of lithium meta arsenite ($LiAsO_2$) comprising mixing lithium carbonate with arsenious trioxide, grinding the mixture and heating the ground mixture to obtain lithium meta arsenite ($LiAsO_2$) and cooling the product so obtained, wherein the lithium carbonate and the arsenious trioxide have the molar ratio of 1:1 such that lithium:arsenic are in 1:1 proportion;

wherein the heating of the ground mixture of said lithium carbonate with arsenious trioxide is done at a temperature of 600° C. for 10 hours.

* * * * *